United States Patent
Jilani et al.

(10) Patent No.: US 10,438,212 B1
(45) Date of Patent: Oct. 8, 2019

(54) ENSEMBLE MACHINE LEARNING BASED PREDICTING CUSTOMER TICKETS ESCALATION

(71) Applicant: CA, Inc., Islandia, NY (US)

(72) Inventors: Abdul Khader Jilani, Andhra Pradesh (IN); Narayanabhatla Lalithakishore, Hyderabad Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 1681 days.

(21) Appl. No.: 14/071,096

(22) Filed: Nov. 4, 2013

(51) Int. Cl.
| | |
|---|---|
| G06Q 10/10 | (2012.01) |
| G06Q 10/06 | (2012.01) |
| G06Q 30/06 | (2012.01) |
| G06Q 30/02 | (2012.01) |
| G06Q 30/00 | (2012.01) |
| G06N 20/00 | (2019.01) |
| G06Q 10/00 | (2012.01) |

(52) U.S. Cl.
CPC .......... *G06Q 30/016* (2013.01); *G06N 20/00* (2019.01); *G06Q 10/20* (2013.01); *G06Q 30/0281* (2013.01)

(58) Field of Classification Search
CPC ... G06Q 10/20; G06Q 30/0281; G06Q 30/016
USPC .......................... 705/1.1–912, 305, 304, 346
See application file for complete search history.

(56) References Cited

U.S. PATENT DOCUMENTS

| | | | |
|---|---|---|---|
| 6,260,048 B1 * | 7/2001 | Carpenter | G06F 11/0769 |
| 2011/0270770 A1 * | 11/2011 | Cunningham | G06Q 30/016 |
| | | | 705/304 |
| 2012/0042318 A1 * | 2/2012 | Doan | G06Q 10/06315 |
| | | | 718/103 |
| 2013/0204650 A1 * | 8/2013 | Sabharwal | G06Q 30/016 |
| | | | 705/7.13 |

\* cited by examiner

*Primary Examiner* — Jonathan P Ouellette
(74) *Attorney, Agent, or Firm* — Gilliam IP PLLC

(57) ABSTRACT

A system receives data relating to a ticket from a customer of a business organization. The system processes the data using an ensemble machine learning artificial intelligence processor. The ensemble machine learning artificial intelligence processor includes a natural text language processor for analyzing text exchanged between the customer and an agent of the business organization. The ensemble machine artificial intelligence processor also includes a plurality of multivariate machine learning processors for analyzing a handling of the ticket by the business organization. The system generates results from the analysis of the natural language text processor and the analyses of the plurality of multivariate machine learning processors, and provides the results to a meta-learner processor. The meta-learner processor is operable to generate a likelihood percentage of an escalation of the ticket based on prior escalation predictions of the natural language text processor and prior predictions of the multivariate machine learning processors. The system displays the likelihood percentage of an escalation of the ticket on a computer display device.

14 Claims, 13 Drawing Sheets

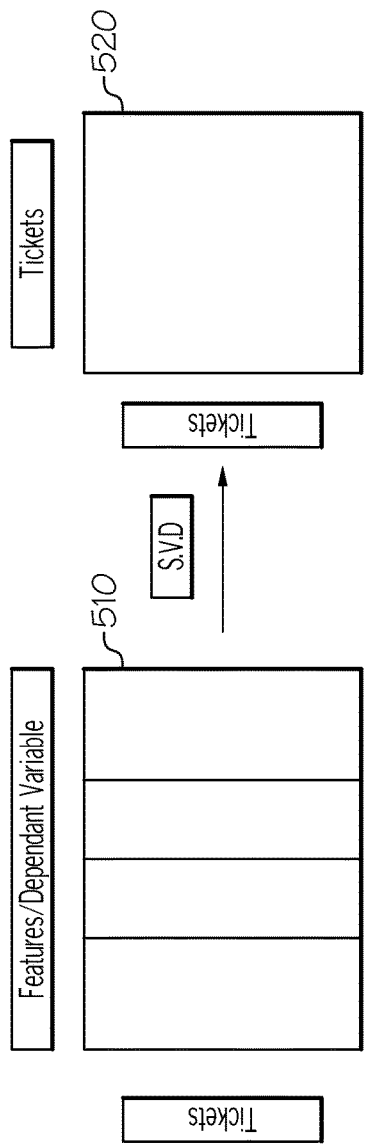
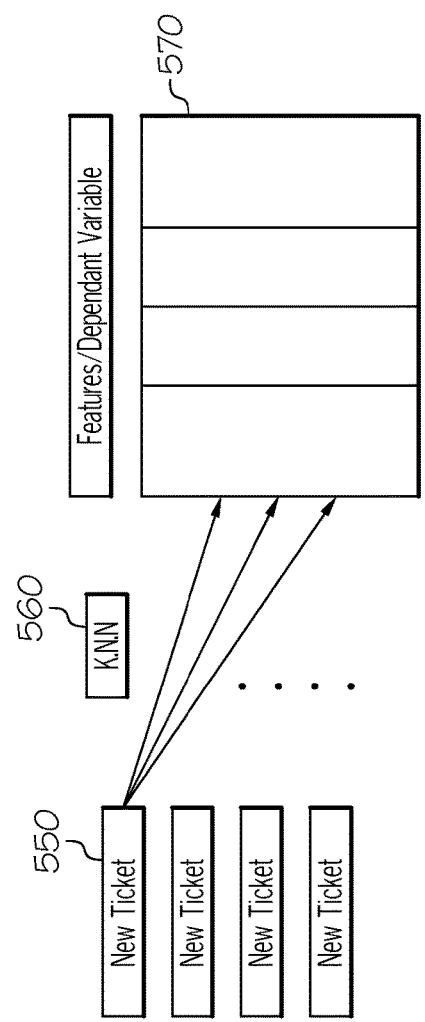

US 10,438,212 B1

ENSEMBLE MACHINE LEARNING BASED PREDICTING CUSTOMER TICKETS ESCALATION

TECHNICAL FIELD

The present disclosure relates to a system and method for determining the likelihood of an escalation of a customer ticket.

BACKGROUND

Many business organizations provide help desks to assist customers who have questions and/or problems with the business organization's products or services. Any such problems are normally noted and recorded by the business organization in a customer ticket. If the question or problem is not adequately addressed by the business organization to the satisfaction of the customer, the ticket can be escalated to a higher level or person within the business organization.

Currently in such customer ticket systems, many service desk administrators/managers only come to know of ticket escalation when it actually happens. One reason for this is that even in a small or medium enterprise, many tickets are created on a daily basis, and it is difficult for the service desk administrator/manager to keep track of all of the tickets. Because of the large number of tickets, manually checking all of these tickets is not humanly possible. And while some service desk operations have become more automated, writing program language rules is not a viable option since there are thousands of possible scenarios, and writing software code to check and to respond to these scenarios is also not feasible. Consequently, when such escalations do occur, it is normally the first time that the service desk manager is aware of any such issues, and this normally leads to customer dissatisfaction.

SUMMARY

Embodiments of the present disclosure include computer systems, computer processes, and computer processes embodied on computer readable media.

In an embodiment, a system is configured to receive data relating to a ticket from a customer of a business organization. The system processes the data using an ensemble machine learning artificial intelligence processor. The ensemble machine learning artificial intelligence processor includes a natural text language processor for analyzing text exchanged between the customer and an agent of the business organization. The ensemble machine artificial intelligence processor also includes a plurality of multivariate machine learning processors for analyzing a handling of the ticket by the business organization. The system generates results from the analysis of the natural language text processor and the analyses of the plurality of multivariate machine learning processors, and provides the results to a meta-learner processor. The meta-learner processor is operable to generate a likelihood percentage of an escalation of the ticket based on prior escalation predictions of the natural language text processor and prior predictions of the multivariate machine learning processors. The system displays the likelihood percentage of an escalation of the ticket on a computer display device.

In another embodiment, the system includes an audio analytic processor. The audio analytic processor receives voice data from the customer and voice data from the agent of the business organization, executes a sentiment analysis and/or text mining using the voice data from the customer and the voice data from the agent, and determines the likelihood percentage of an escalation of the ticket based on the sentiment analysis and/or text mining.

BRIEF DESCRIPTION OF THE DRAWINGS

FIGS. 5A and 5B illustrate features of a similarity-based learning model for analyzing customer tickets.

DETAILED DESCRIPTION

Figure 1:
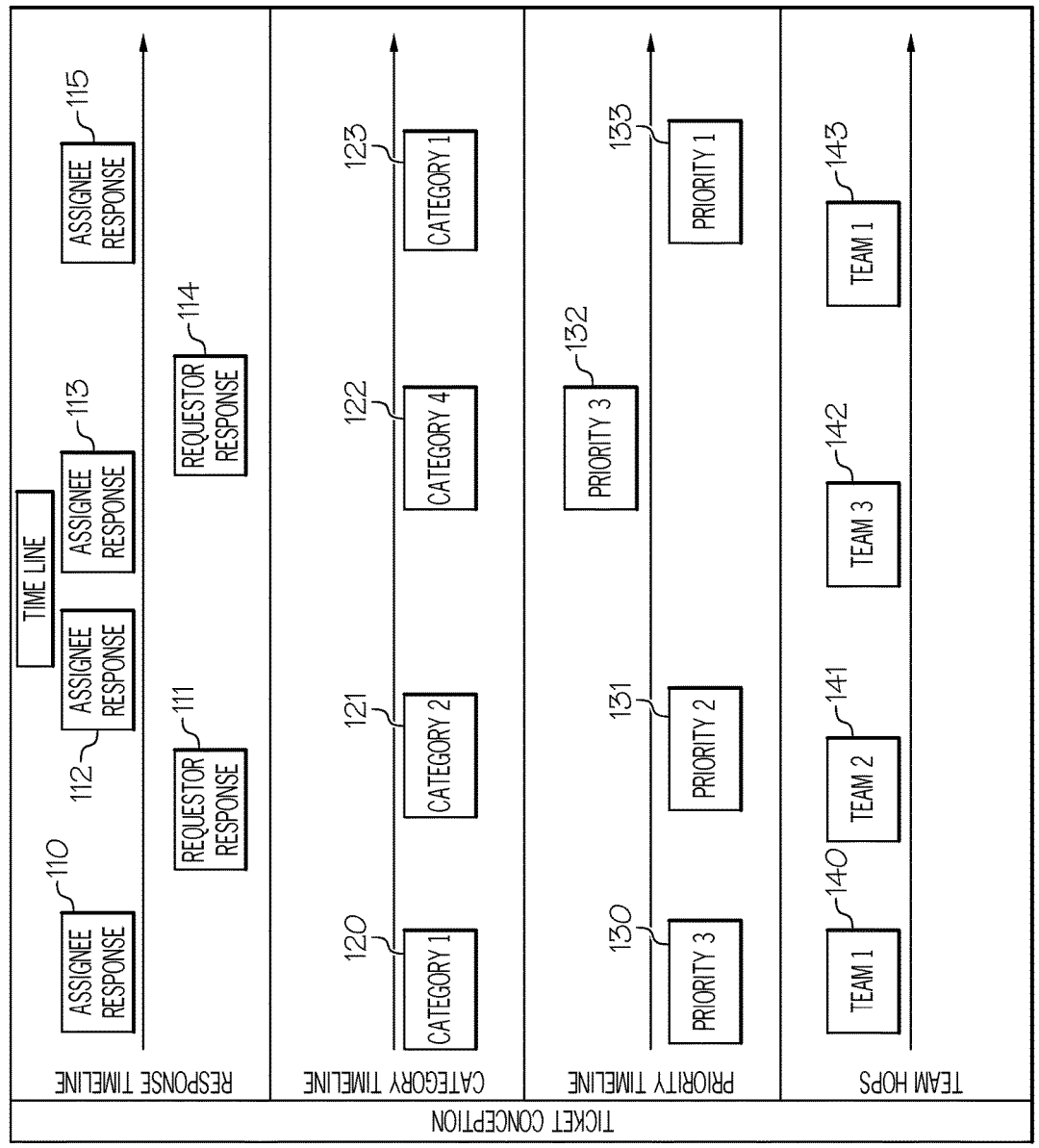
FIG. 1 illustrates an example timeline of a handling of a customer ticket.

In the following detailed description, reference is made to the accompanying drawings that show, by way of illustration, specific embodiments that may be practiced. These embodiments are described in sufficient detail to enable those skilled in the art to practice these embodiments. It is to be understood that the various embodiments, although different, are not necessarily mutually exclusive. For example, a particular feature, structure, or characteristic described herein in connection with one embodiment may be implemented within other embodiments without departing from the scope of the present disclosure. In addition, it is to be understood that the location or arrangement of individual elements within each disclosed embodiment may be modified without departing from the scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

A customer escalation is a scenario in which a customer is not pleased with his or her dealings with an employee or other agent of a business organization, and wherein the customer wants someone at a higher level within the business organization to resolve the complaint. The concept of escalation is often mentioned when dealing with incident and problem management processes. Typical incident management processes involve hierarchical and functional escalations, and these escalations are normally handled or managed by a separate dedicated team of people. Most every company has its own escalation management process, which is normally well-defined and documented.

In any particular situation, there could multiple reasons for a customer escalation. For example, there could be a lack of knowledge on the part of the business organization agent who is handling the customer ticket. The agent could also lack confidence or have a negative or disagreeable attitude, both of which could contribute to or lead to a customer escalation. The agent could also fail to communicate clearly to the customer or not meet the desired timeline of the customer. There also is the situation where a customer is given an inadequate response without any apparent reason or explanation. Finally, when the problem resolution process does not go swimmingly, and the customer fails to receive a simple apology, this can lead to customer escalation. In short, these escalations lead to customer dissatisfaction, loss of customers, and loss of business and revenue.

If it could be predicted that a customer ticket will likely be escalated in the future, then a service desk administrator could take the necessary steps to mitigate the chances of escalation. In an embodiment, using a customer early escalation meter, the tickets that are likely to be escalated are identified in advance and the service desk administrator does not have to monitor the pending tickets. Consequently, an embodiment reduces manpower, effort, cost, and leads to an increase in customer confidence and satisfaction. With the advent of big data and advancement of data science, an ability to predict likely ticket escalations will very likely be a requirement in any service desk software. Prior art customer ticket systems are not productizable, meaning that they have to be built/redesigned for every customer implementation. Consequently, the management of tickets is still basically a manual process. An embodiment of the current disclosure can be built once and attached to existing service desk management software, and it wouldn't need a machine learning expert to rebuild/redesign it for every customer.

An embodiment includes a unique feature of accurately predicting the customer tickets that will be escalated, in advance of such an escalation, and using a robust model of an ensemble artificial intelligence module that is based on numeric analysis, rules implementation, similarity analysis, and natural language processing (NLP). An embodiment is also unique in the sense that it can be autonomous and can be productized unlike many current machine learning solutions, which can only be offered in a service model. Also, none of the service desk products in the market have any such prediction features. Consequently, embodiments of the present disclosure advance the state of the art of enterprise service desk products.

Figure 2:
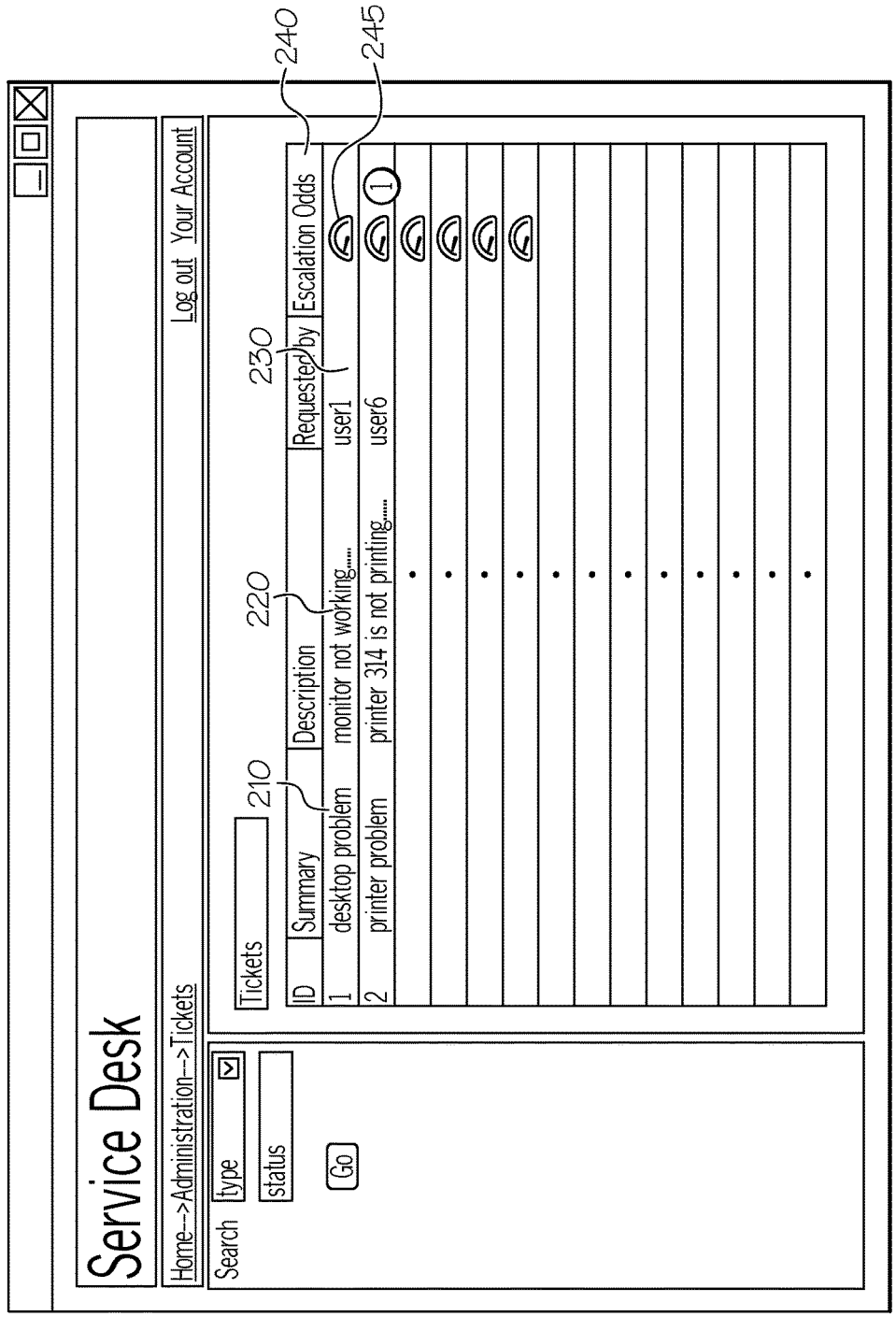
FIG. 2 is an example user interface that lists customer tickets.
Figure 3:
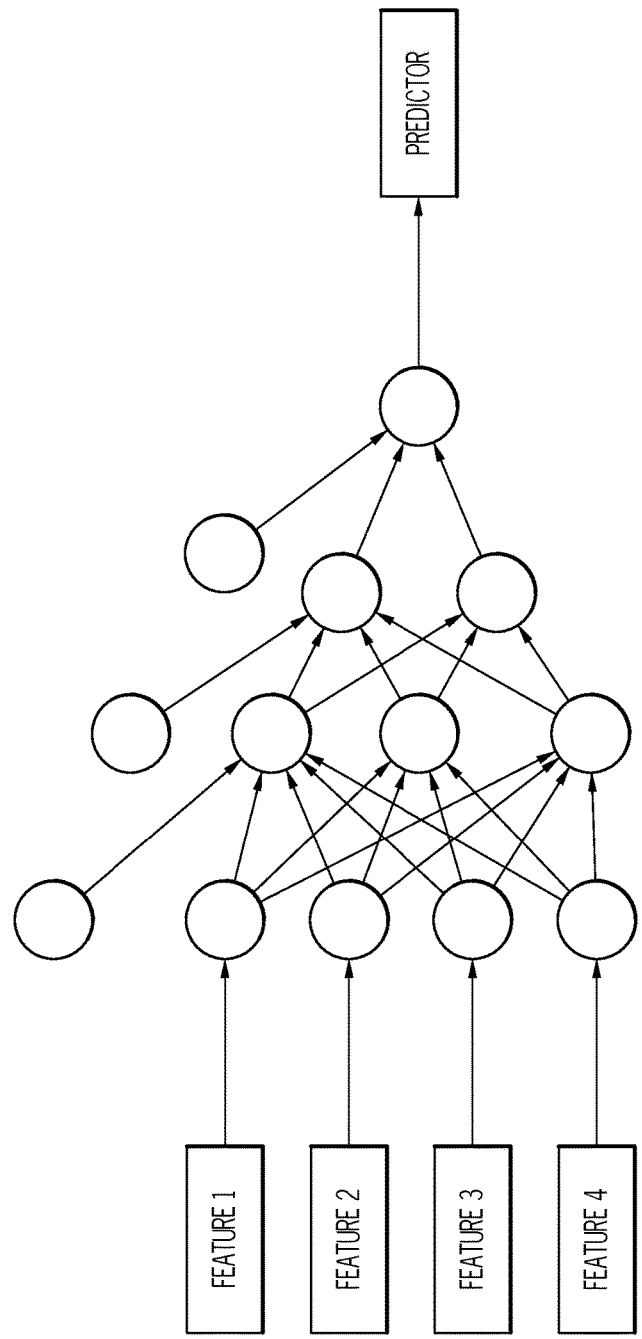
FIGS. 3A and 3B illustrate features of a logistical regression analysis of customer tickets.
Figure 4:
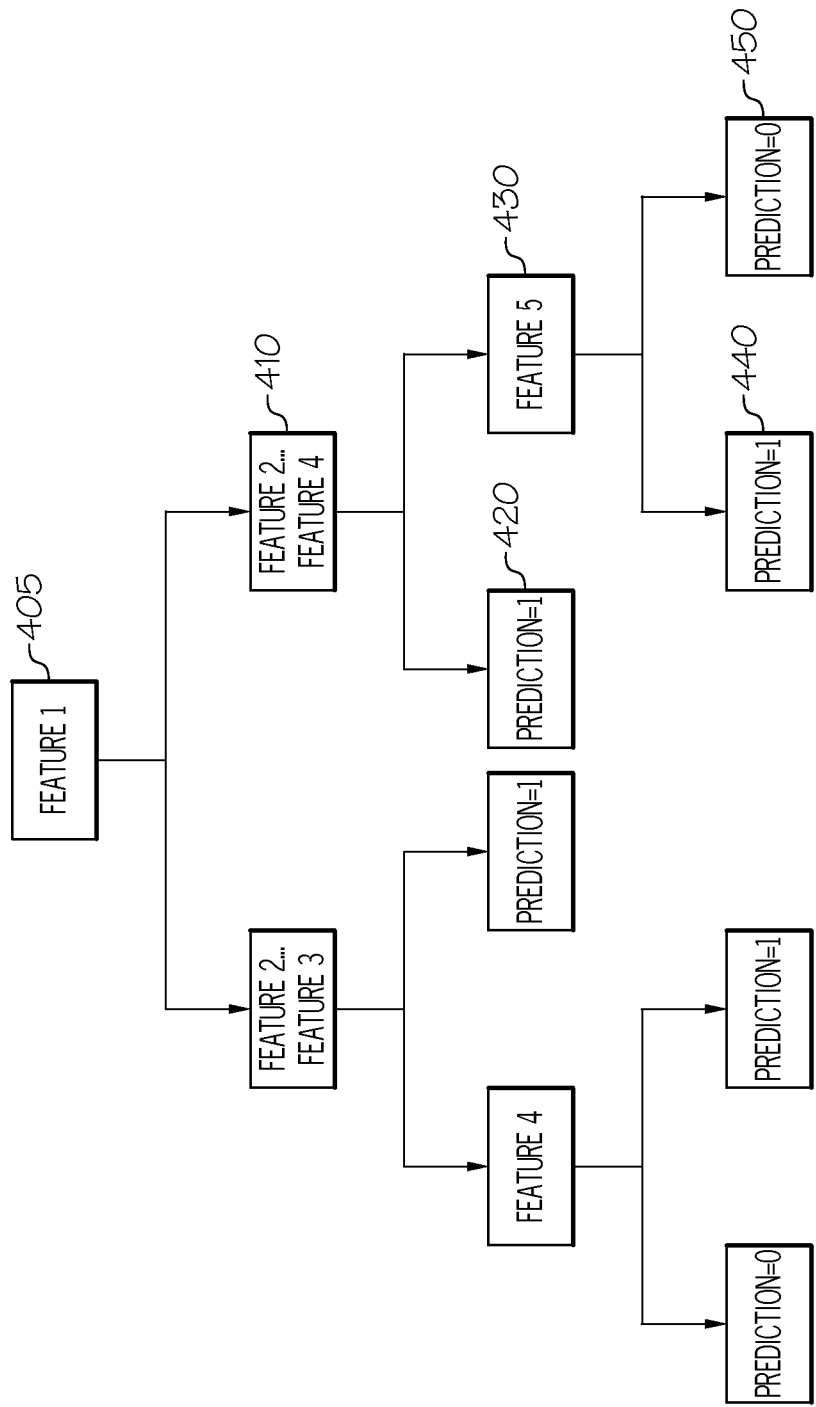
FIG. 4 illustrates an example tree structure for analyzing customer tickets.
Figure 10:
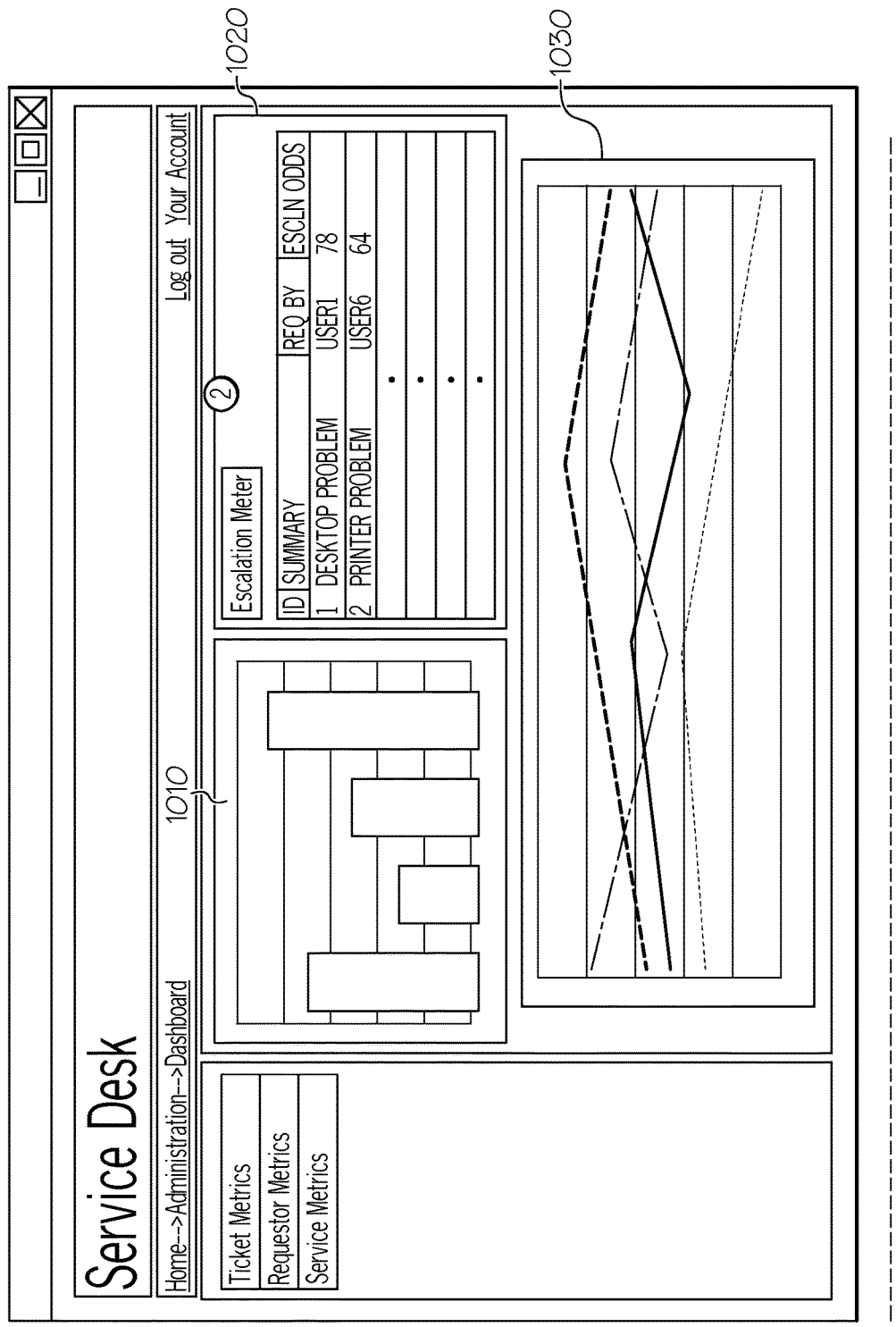
FIG. 10 is an example user dashboard interface for an ensemble machine learning artificial intelligence system.

An embodiment includes a customer early escalation meter user interface. Examples of such user interface meters are illustrated in FIGS. 2 and 10, which will be discussed in more detail herein. The customer early escalation meter user interface is a service desk product feature that displays the odds of a ticket getting escalated in advance of such escalation to enable corrective action by the product administrators (and perhaps the preventing of any such escalation). The customer early escalation meter visualizes the odds of escalation of a ticket as a percentage against each ticket in the user interface screen used by the product administrators to monitor tickets of a service desk product. The ticket escalation meter or widget has the list of customer tickets sorted in descending order based on odds of escalation so that the administrators can identify the highest priority tickets. Since no artificial intelligence model is 100% accurate, the system can track the escalated tickets that were not predicted, and these unpredicted customer tickets can be used for artificial intelligence retraining as is explained herein. In an embodiment, the administrator also has an option of adjusting weights or deselecting features manually or statistically using a correlation matrix visualizer provided as part of the feature in the product. Specifically, in an embodiment, the administrator can use a correlation model to statistically assign weights to the features to improve accuracy of the ticket escalation predictions.

Figure 8:
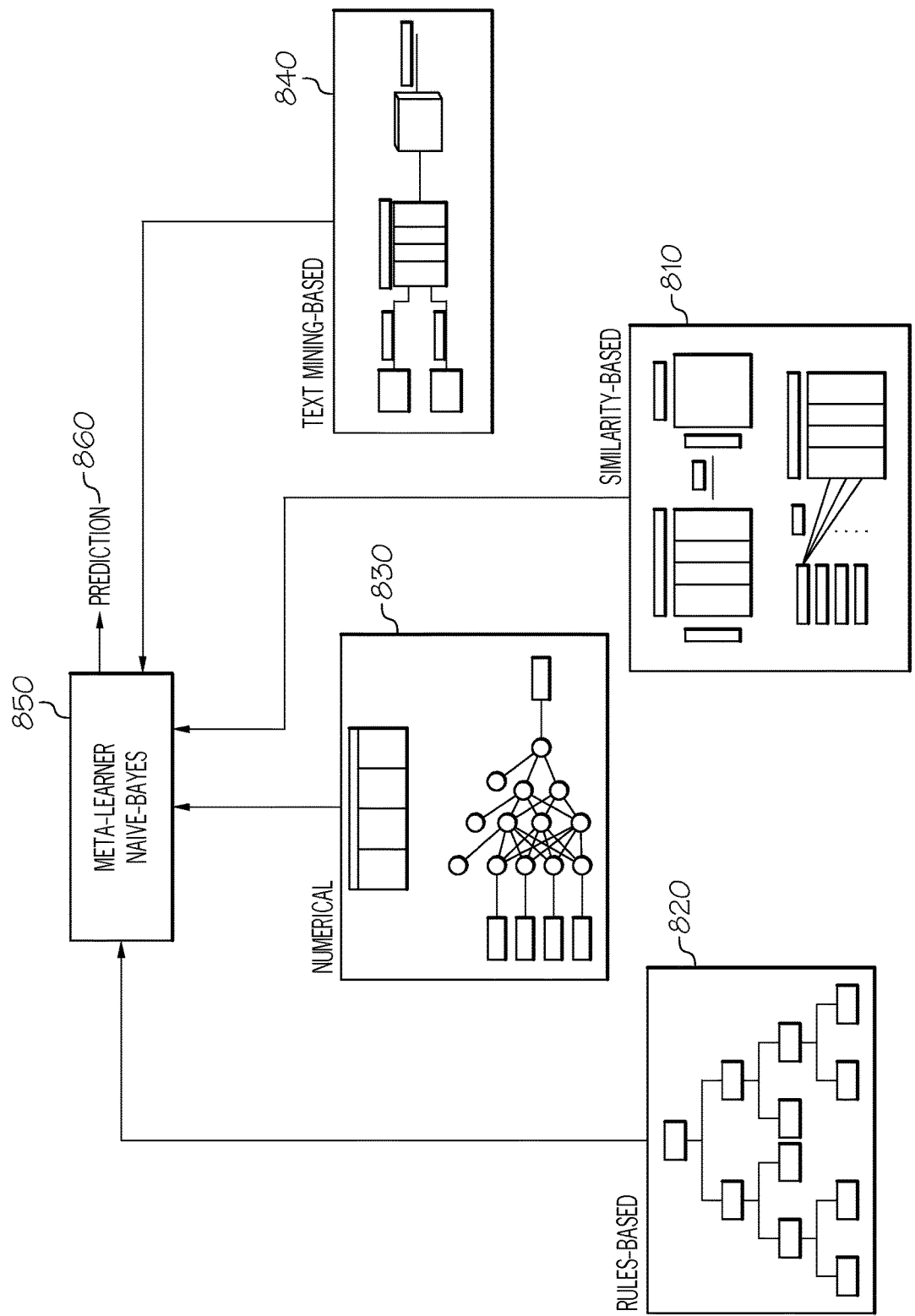
FIG. 8 is a block diagram illustrating an example embodiment of an ensemble machine learning artificial intelligence system.

The customer early escalation meter is a combination of a visualization widget (FIGS. 2 and 10) and an artificial intelligence based backend system (FIG. 8). The customer early escalation meter leverages an artificial intelligence system built up on a model of machine learning algorithms that can estimate in its backend the odds of a ticket being escalated. The backend system includes two parts. A first part based on structured data like the past history of similar tickets, severity of the ticket, priority of the ticket, criticality of the issue in the ticket, category of the ticket, customer's past history, agent's past history, and the agent's knowledge in the ticket category. A group of multivariate machine learning algorithms for metric based forecasters that work with ticket based metrics like hops between teams, ticket re-open identifiers, severity, severity changes, priority, priority changes, idle time from last communication, gaps in response, category changes, number of assignees etc., is used to predict the odds of escalation. A second part is based on unstructured data like text used for communication between the agent and the customer. A group of text processing machine learning algorithms for text mining on the ticket comments is used to predict the escalation odds based on the text exchanged between ticket assignee and the ticket requestor. The ticket escalation meter includes a dashboard/report that shows the status of each ticket on the escalation meter.

A customer may escalate a ticket due to the poor quality of support like improper response, delays in correspondence and resolution, etc. As referred to above, to identify whether a ticket is likely to be escalated or not, tell tale signs are examined such as comments recorded in the tickets, the nature of comments by the person assigned to handle the ticket, the nature of replies from the customer, the transfer and/or multiple transfers of responsibility for handling the ticket between or among problem solving teams, an indication that a ticket has been closed and then re-opened, the severity of a ticket, changes in the severity of a ticket, the priority of a ticket, changes in ticket priority, idle time in communications between a customer and a person working on the ticket, and category changes to the ticket. These tell tale signs are examined in more detail in the following paragraphs.

There are additional factors that can be considered when trying to predict if a particular customer ticket will be escalated. For example, tickets can be categorized, and a particular ticket category may be more prone to escalation than other categories. Along these same lines, a level of severity or priority may be associated with each ticket, and tickets with a higher severity or priority level may be more susceptible to an escalation than tickets of lower severity or priority levels. Similarly, any changes to the severity or priority level of a ticket during the life of the ticket can indicate the possibility of the ticket becoming escalated. That is, quite simply, if the severity level of a ticket is increased during the life of the ticket, then the chances that that ticket will be escalated is increased. Changes in the category to the ticket during the ticket life cycle can also indicate increased chances of ticket escalation.

The ticket creation date and a customer "GoLive" date can also be a factor. That is, if the ticket was created some time ago, and the date that the customer system is going to be implemented in fast approaching, then the possibility increases with each passing day that the ticket will be escalated.

The nature of the comments and replies between the customer and the agent of the business organization can also have a bearing on the likelihood of an escalation of a customer ticket. For example, if it is noted during the handling of the ticket that the customer is "Just not happy," then this is indicative that there is a likelihood of the ticket becoming escalated. Along these lines, if there is idle time or gaps in the communications between the customer and the agent, then as the time of the gaps or number of the gaps increases, then so do the chances of ticket escalation.

The number of "hops" in ticket assignment can also indicate the possibility of ticket escalation. For example, if a ticket is being assigned and re-assigned to multiple agents within the company, with no resolution in sight, then it is likely that a customer will become dissatisfied and ticket escalation will occur. Similarly, if a ticket was marked as "solved," but later has to be re-opened, then the chances that such a re-opened ticket will become escalated will be increased.

The past histories of the customer and agent can also have an effect on the chances of ticket escalation. Specifically, if the customer has a history of being dissatisfied and escalating tickets, and/or the agent has a history of having the tickets that are assigned to him or her being escalated, then the chances of a new ticket being escalated for this customer or agent is increased. In contrast, if for example the agent is quite experienced and competent, and rarely ever has a ticket escalated, then the chances that a new ticket will be escalated for this agent may be decreased, even with a customer who has a history of ticket escalation.

The number of defects or bugs that are associated with applications or the category that the ticket belongs to can have an effect on whether a ticket will be escalated or not, especially if the application is specifically related to, or specifically used for, a particular type of ticket.

FIG. 1 is an example timeline illustrating how some of these tell tale signs can change over time. For example, FIG. 1 illustrates that an assignee (that is, an agent assigned to handle a customer ticket) can respond to a requestor (customer) at 110. The customer then responds to the agent at 111, and the agent responds to the customer twice at 112 and 113. The customer responds to the agent again at 114, and the agent responds to the customer once again at 115. These multiple communications between an agent of the business organization and the customer can indicate the lack of a resolution to the ticket, and the possibility of an escalation of the ticket.

FIG. 1 shows that a ticket can be assigned to a Category 1 at 120, can be changed to a Category 2 at 121, further changed to a Category 4 at 122, and then changed back to a Category 1 at 123. The categories can relate to a particular area or technology with which the ticket is associated. For example, a first category can relate to software problems, a second category can relate to hardware problems, and a third category can relate to network problems. If the customer ticket changes categories one or more times during the life of the ticket, that could indicate that there is a problem in resolving the ticket, and could further indicate that there is a possibility that the ticket will be escalated.

FIG. 1 also illustrates that during the life of a ticket, the priority of the ticket can be changed from a Priority 3 at 130 to a Priority 2 at 131, back to a Priority 3 at 132, and then to a Priority 1 at 133. If the priority is increasing during the life of the ticket, then that could be indicative of the possibility of an escalation of the ticket. On the other hand, if the priority is decreasing during the life of the ticket, then that could be indicative that the chances of the ticket being escalated are decreasing.

Finally, FIG. 1 further illustrates how a ticket was initially assigned to Team 1 at 140, but thereafter got reassigned to Team 2 at 141, then to Team 3 at 142, and then back to Team 1 at 143. These multiple hops in the handling of a ticket indicate the possibility that the ticket could be escalated. The aforementioned tell tale signs are just an example listing, and those of skill in the art will know of other tell tale signs, and in particular, tell tale signs that are unique to a particular business or industry.

Based on observations of such tell tale signs, rudimentary rules could be developed that aid in identifying tickets that may be escalated. However, such rudimentary rules would not function adequately because these rules would be built manually and without any type of learning imbued therein. Also, as noted above, there are too many scenarios and patterns for which to write rules. There are many patterns that are not directly visible or mineable to be able to establish rules, so the system uses the machine learning to discover and analyze such patterns. Consequently, in an embodiment, machine learning algorithms, and in particular the assembling of such machine learning algorithms, can do the task of learning and predicting the odds of escalation. In an embodiment, the artificial intelligence is trained on substantial historical service desk data and has a control feedback for performance assessment and corrective learning mechanisms based on the aforementioned control feedback. As such, the system is able to predict an escalation of a ticket.

Specifically, an embodiment builds a system that has an artificial intelligence (AI) model built in the backend, as is illustrated in FIG. 8. The back end AI model consists of multiple machine learning algorithms (810, 820, 830, 840; FIGS. 3A, 3B, 4, 5A, and 5B) that co-exist in an ensemble mode, and that provide their results to a meta-learner algorithm 850, which generates a prediction 860. These multiple machine learning algorithms are trained on service desk data and take in the parameters of each open ticket in the service desk system and predict the odds of it being escalated. In addition to predicting the odds or likelihood of ticket escalation, the system also has a mechanism to re-train the AI model if it makes too many mistakes. Specifically, an error rate is periodically calculated in real time based on accuracy, precision, and recall metrics. If and when the error rate reaches a threshold, the AI algorithms are updated. This updating is done by training the machine learning algorithms on the latest data. Once they are re-trained, the accuracy, precision, and recall metrics can be verified by the service desk administrators and the AI model that has just been trained with the new data can be used.

In an embodiment, the AI model has the following structure. The AI model has a group of text processing machine learning algorithms for text mining and Natural Language Processing (NLP) 840 on the ticket. Comments/textual data are used to predict the escalation odds based on the text exchanged between ticket assignee (agent of the business organization) and the ticket requestor (customer). A group of multivariate machine learning algorithms for metric-based, rule-based 820, similarity-based 810, and numeric feature-based 830 classifiers work with ticket based metrics like hops between teams, ticket re-open identifier, severity, severity changes, priority, priority changes, idle time from last communication, gaps in response, category changes, number of assignees etc., to predict the odds of escalation. A low bias meta learner algorithm 850 sits on top of and learns from the multivariate machine learning algorithms of NLP, rule-based, similarity-based, and numeric feature-based classifiers to add autonomy and adaptability to the AI model.

Figure 9:
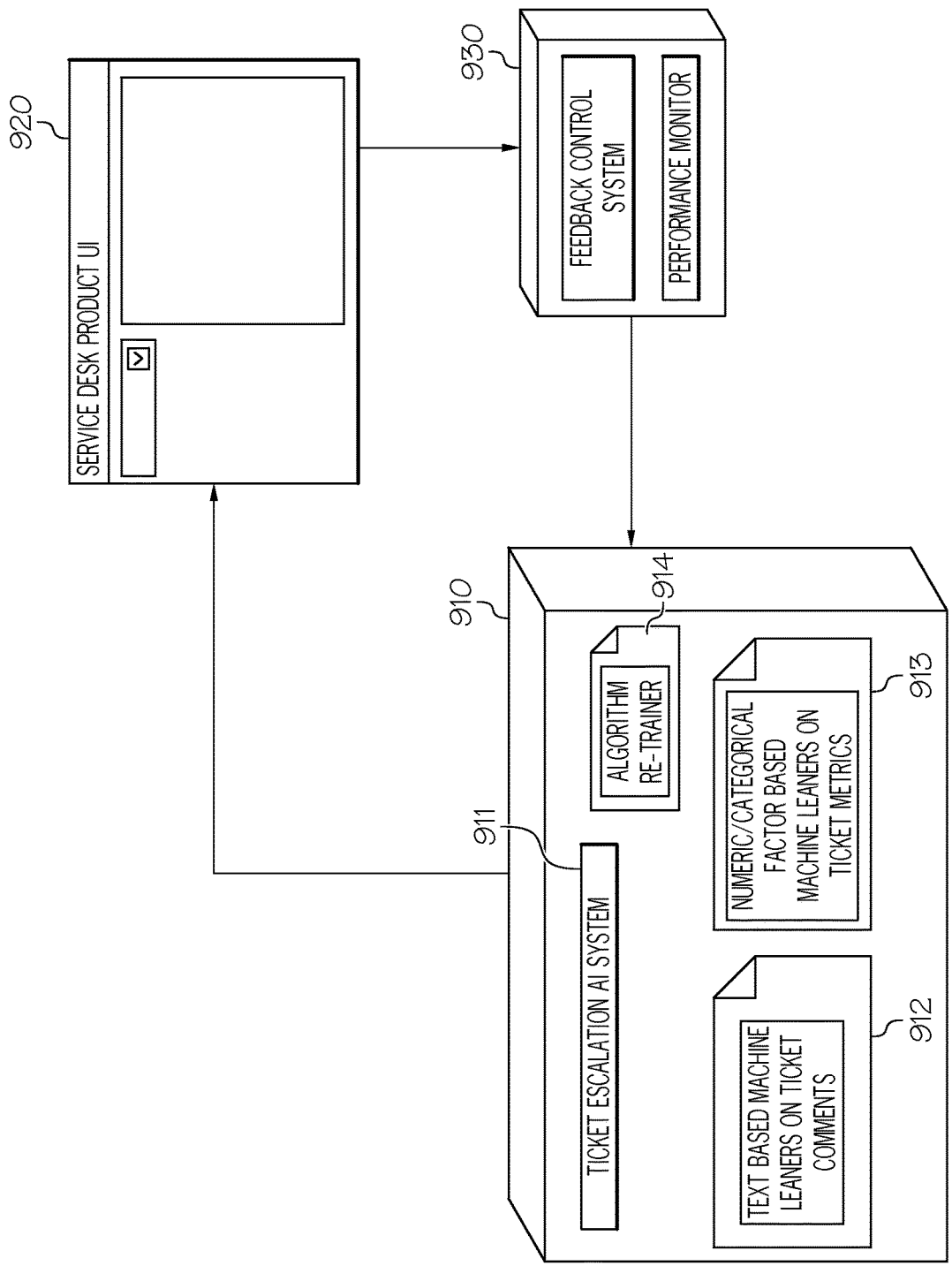
FIG. 9 is a block diagram illustrating a feedback subsystem and a re-training subsystem for an ensemble machine learning artificial intelligence system.

The feedback control mechanism illustrated in FIG. 9 provides the function of monitoring the performance of the AI model over time. The feedback control mechanism keeps monitoring the accuracy, precision, and recall metrics periodically. The service desk administrators can configure the acceptable thresholds for these metrics in the configuration screen provided with a widget. If these thresholds are exceeded, the feedback control initiates the procedure that re-trains the AI model on new service desk data. The re-training procedure uses the tickets in the system and creates balanced samples of escalated and non-escalated tickets and re-trains the algorithms on the new samples. The performance of the newly trained algorithms is monitored and reported to the service desk administrator. Thereafter, the AI model switches to the new algorithms and continues to display data in the customer early escalation meter.

The final component of the ensemble model is a low bias model that is a meta-learner 850 that learns from the results of each model and the actual result of the ticket. That is, the meta-learner examines whether the ensemble model predicted an escalation and then determines whether an actual escalation did in fact occur. This ensemble model is a stacking model that uses a low bias algorithm (meta-learner) to learn on the training data and the predictions of the underlying models to improve accuracy. All of the individual models (rule based, similarity based, numeric based) provide a prediction of the possibility of a ticket escalation, and the trained meta-learner provides a prediction of the possibility of a ticket escalation using the outputs of the base models to give the final prediction output. This structure is more robust than prior ticket reporting systems, and it provides increased accuracy over the heuristic use of individual models (for example, predicting ticket escalations by comparing results of algorithms to a simple threshold). Consequently, an embodiment is much more adaptable, autonomous, and productizable as compared to prior art ticket systems.

Figure 11A:
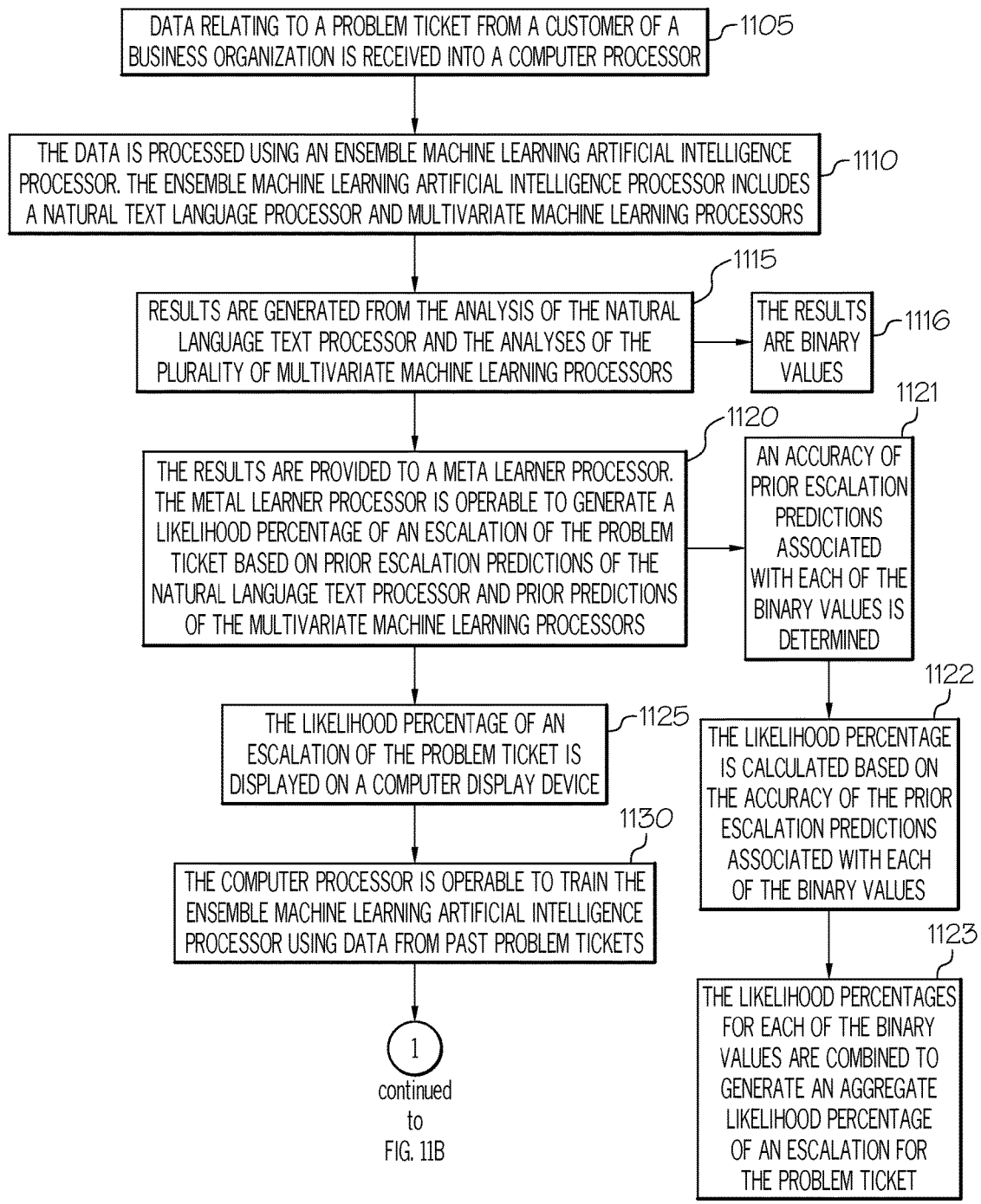
FIGS. 11A and 11B are a block diagram illustrating operations and features of an ensemble machine learning artificial intelligence system.
Figure 11B:
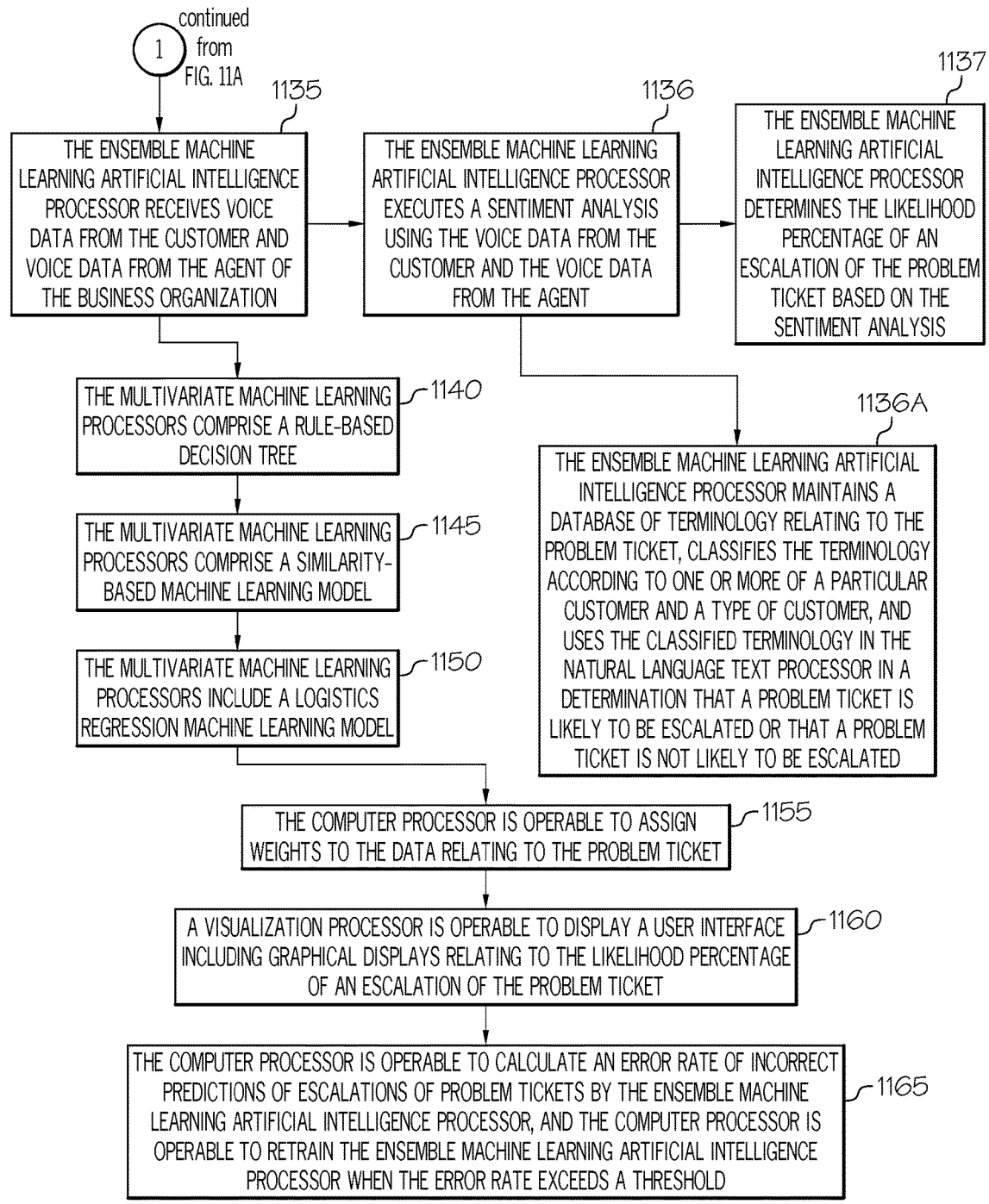

FIGS. 11A and 11B are a block diagram illustrating operations and features of an ensemble machine learning artificial intelligence system. FIGS. 11A and 11B include a number of operation and/or feature blocks 1105-1165. Though arranged serially in the example of FIGS. 11A and 11B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 11A and 11B, at 1105, data relating to a ticket from a customer of a business organization is received into a computer processor. As noted above, this data can relate to a category of the ticket, a severity of the ticket, a reassignment of the ticket, etc. At 1110, the data is processed using an ensemble machine learning artificial intelligence processor. The ensemble machine learning artificial intelligence processor includes a natural text language processor for analyzing text exchanged between the customer and an agent of the business organization. The agent is normally an employee of the business organization who is assigned to handle, address, and solve the problem that is reported in the ticket. The ensemble machine artificial intelligence processor also includes a plurality of multivariate machine learning processors for analyzing the manner in which the ticket is handled by the business organization. As noted above, the analysis of the manner in which a ticket is handled can include, for example and among other things, considering the age of the ticket and the number of days before a customer's system "goes live." At 1115, results are generated from the analysis of the natural language text processor and the analyses of the plurality of multivariate machine learning processors. In an embodiment, as illustrated at 1116, these results are binary values, and these binary values can be stored in a string. The binary results indicate, for each particular processor or algorithm (for example the similarity based algorithm), whether the algorithm determined that a particular ticket is likely to be escalated (binary value=1) or whether a ticket is not likely to be escalated (binary value=0). There may be more than one algorithm per processor. For example, a processor may have more than one type of decision tree (c5.0, RPART, or Hellinger). In such a scenario, the outputs of these different algorithms serve as input to the meta-learner algorithm. At 1120, the results are provided to a meta-learner processor. The low bias meta-learner processor is operable to generate a likelihood percentage of an escalation of the ticket based on prior escalation predictions of the natural language text processor and prior predictions of the multivariate machine learning processors. At 1125, the likelihood percentage of an escalation of the ticket is displayed on a computer display device.

The details of the generation of the likelihood percentage of an escalation for the ticket are outlined in blocks 1121-1123. At 1121, an accuracy of prior escalation predictions associated with each of the binary values is determined. For example, each binary value represents a particular processor or algorithm. If the binary value at issue represents a logistical regression algorithm, then the processor examines the past history of the logical regression algorithm. Specifically, the processor determines for example that in the recent past, when the algorithm predicted an escalation, an escalation actually occurred in 75% of those cases. This percentage (0.75) is then reported to the ensemble machine artificial intelligence processor. This is illustrated in block 1122, wherein it states that the likelihood percentage is calculated based on the accuracy of the prior escalation predictions associated with each of the binary values. At 1123, the likelihood percentages for each of the binary values (which represent a particular processor or algorithm) are combined to generate an aggregate likelihood percentage of an escalation for the ticket. This combination can be a generation of a multiplication product using each of the binary values from all of the processors or algorithms of the ensemble machine artificial intelligence processor. A low bias meta-learner algorithm can be rule-based or numerically-based. A system administrator can be given the choice which type of low bias meta-learner algorithm to use.

In addition to the binary value, each processor or algorithm can generate an accuracy or error percentage that is associated with its generated binary value. For example, with a similarity based algorithm, prior ticket data can be organized into clusters, and the accuracy or error percentage of a current ticket prediction can be based on the nearness of the current ticket to one or more prior ticket clusters.

Returning to FIGS. 11A and 11B, at 1130, it is indicated that the computer processor is operable to train the ensemble machine learning artificial intelligence processor using data from past tickets. For example, when dealing with a binary tree algorithm, a decision point in the tree may depend on the past history of the agent who is handling the ticket. If the agent is a relatively new employee, then the tree may indicate that for this relatively new agent it is likely that a ticket will be escalated. However, as the employee-agent becomes more experienced, then less and less of his or her tickets will likely be escalated. The ensemble machine learning artificial intelligence processor can be trained or retrained to reflect this.

The ensemble machine learning artificial intelligence processor can also include an audio analytic processor. The functionality of the audio analytic processor is illustrated in blocks 1135-1137. Specifically, at 1135, the ensemble machine learning artificial intelligence processor receives voice data from the customer and voice data from the agent of the business organization. This voice data can be a simple digital file of the conversation. At 1136, the ensemble machine learning artificial intelligence processor executes a sentiment analysis and/or text mining using the voice data from the customer and the voice data from the agent. In an embodiment, the sentiment analysis and/or text mining can search for words used in the conversation that may indicate that the ticket is likely to be escalated. For example, the system may recognize words such as "angry", "unhappy", "sorry", "delay", "urgent", "quickly", and "due date" to indicate urgency of the situation and/or displeasure of the customer and possible ticket escalation. As indicated at 1136A, the ensemble machine learning artificial intelligence processor maintains a database of terminology relating to the ticket, classifies the terminology according to one or more of a particular customer and a type of customer, and uses the classified terminology in the natural language text processor in a determination that a ticket is likely to be escalated or that a ticket is not likely to be escalated. In this manner, business relevant terminology can be added to the database and corpus of knowledge. The system provides the ability to update the corpus that is used in the natural language processing. In the updating and maintaining of this corpus, multiple synonyms may be stored. For example, one business organization may describe a problem using the term "failure", while a second business organization may tend to use the term "shutdown." Similarly, an IT manager may report that the system has crashed or that the system is down, whereas an end user may simply report that the system is not working. At 1137, the ensemble machine learning artificial intelligence processor then determines the likelihood percentage of an escalation of the ticket based on the sentiment analysis and/or text mining.

At 1140, the multivariate machine learning processors comprise a rule-based decision tree. The rule-based decision tree is configured to determine a likelihood that the ticket will be escalated based on the handling of the ticket by the business organization. For example, referring to FIG. 4, in block 405, Feature 1 can relate to the severity of the ticket. If the severity is greater than a threshold, then the binary tree algorithm branches to block 410. If the severity is less than the threshold, then the other branch of the tree is taken. In block 410, Feature 2 can relate to the age of the ticket, and Feature 4 can refer to the number of hops among agents that the ticket has experienced. If the age is greater than a threshold, and the number of hops is greater than a threshold, then the branch to block 420 is taken and the binary prediction value is set to 1, that is, the binary tree algorithm reports that the data relating to the ticket indicates that an escalation is likely. However, if one or both of the age of the ticket and the number of hops associated with the ticket indicates that an escalation is not likely, then Feature 5 is examined in block 430. If, for example, Feature 5 relates to the category of the ticket, and the particular software application category at issue normally indicates that a ticket is escalated, then the branch is taken to block 440 and the binary value of the rule-based tree algorithm for this ticket is set to 1, indicating the likelihood that the ticket will be escalated. If the category relates to a network issue, then the system will branch to block 450, which indicates that the ticket is not likely to be escalated.

At 1145, the multivariate machine learning processors comprise a similarity-based machine learning model, for example, a K-nearest neighbor model. The similarity-based machine learning model is configured to compare data of a current ticket to data of past tickets. The similarity-based machine learning model is further configured to determine a likelihood that the ticket will be escalated based on the comparison of the data of the current ticket to the data of past tickets. In an embodiment, as illustrated in FIG. 5A at 510, the features of prior tickets (e.g., age of ticket, severity of ticket, category of ticket, etc.) are reduced to a value via a single value decomposition (SVD) process. These single values for all prior tickets can be plotted at 520 to identify any clusters in the prior ticket data. An SVD value can then be calculated for a current ticket, and plotted to determine its proximity to one or more clusters of prior ticket data. The current ticket can then be identified as likely to be escalated (1) or not likely to be escalated (0). FIG. 5B illustrates the manner in which new tickets 550 are exposed to a K-nearest neighbor algorithm 560, the results of which can be stored at 570.

At 1150, the multivariate machine learning processors include a logistics regression machine learning model. The logistics regression machine learning model is configured to analyze the handling of the ticket by the business organization. The logistics regression machine learning model is further configured to determine a likelihood that the ticket will be escalated based on the analysis by the logistics regression machine learning model. For example, referring to FIGS. 3A and 3B, a plurality of features are loaded into a logistics regression machine learning model. The features then percolate through the model based on the logic of the model, and a binary value indicating that there is a likelihood that the ticket will be escalated or that there is not a likelihood that the ticket will be escalated is reported to the ensemble machine learning artificial intelligence processor.

At 1155, the computer processor is operable to assign weights to the data relating to the ticket. For example, the severity of the ticket may be considered to be a critical factor. The severity factor can then be weighted accordingly, and this weight will be used in the processing of the severity factor by the processors or algorithms. Similarly, a particular processor may be considered to be more critical than others. This could be because the particular algorithm executed by that processor has a history of being more accurate than other processors. In such cases, the processor or algorithm could be weighted accordingly.

At 1160, a visualization processor is operable to display a user interface including graphical displays relating to the likelihood percentage of an escalation of the ticket. Referring to FIG. 2, a summary of the ticket is displayed at 210, a description of the ticket is displayed at 220, and the requestor or customer who reported the problem is identified at 230. The likelihood that the ticket will be escalated, as determined by the ensemble machine learning artificial intelligence algorithm, is reported at 240. In an embodiment, the indication is a meter 245, which includes a dial indicating the likelihood of escalation for that ticket. FIG. 10 illustrates another embodiment of a user display. In FIG. 10, a thumbnail version of the interface of FIG. 2 is displayed at 1020. The window 1010 includes a bar graph. The bar graph can be configured to represent many different pieces of information. For example, the bar graph may indicate the past error percentages of each processor or algorithm (binary tree, similarity-based, etc.) Similarly, the graph at 1030 can represent many different pieces of information. For example, the graph may represent the trends of the past error percentages of each processor or algorithm.

At 1165, the computer processor is operable to calculate an error rate of incorrect predictions of escalations of tickets by the ensemble machine learning artificial intelligence processor, and the computer processor is operable to retrain the ensemble machine learning artificial intelligence processor when the error rate exceeds a threshold. Referring to FIG. 9, a module 910 includes a ticket escalation system 911, such as the ensemble machine learning artificial intelligence processor. As noted throughout this disclosure the escalation system 911 can include a text based module 912 and a numerical/categorical module 913. A user interface 920 interfaces with the ticket escalation system 911, and a feed back control system 930 provides feedback to the ticket escalation to retrain the ticket escalation system when needed.

Figure 6:
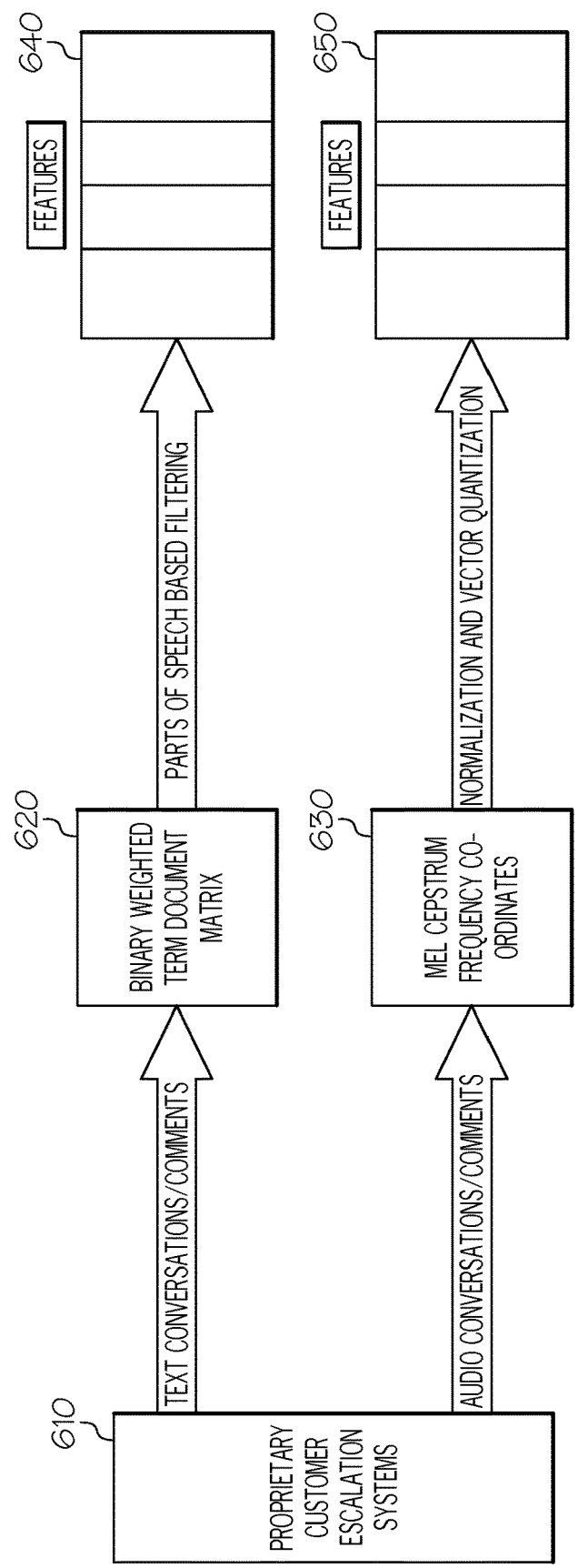
FIG. 6 illustrates features of a text analysis model for analyzing customer tickets.
Figure 7:
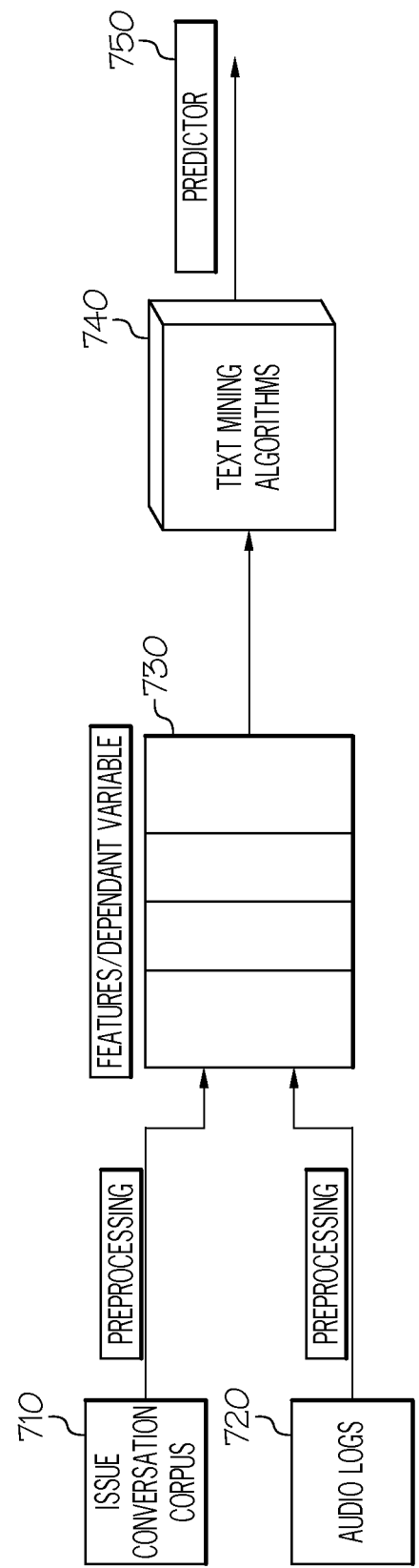
FIG. 7 illustrates additional features of a text analysis model for analyzing customer tickets.

FIGS. 6 and 7 are block diagrams illustrating features of the natural language processing features and audio processing features of the present disclosure. Referring to FIG. 6, text conversations and comments and audio conversations and comments from a customer escalation system 610 are provided to a binary weighted term document matrix 620 and a term frequency-inverse document frequency (tf-idf) or any other word frequency matrix 630 and an audio frequency coordinates module if audio data is captured. Features are extracted by the matrix 620 and module 630 and stored at 640 and 650 respectively. Referring to FIG. 7, a conversation corpus 710 and audio log 720 are processed to extract features at 730. The features or terms are processed by a text mining algorithm at 740, and a prediction based on the data in the corpus 710 and audio logs 720 is made at 750.

Figure 12:
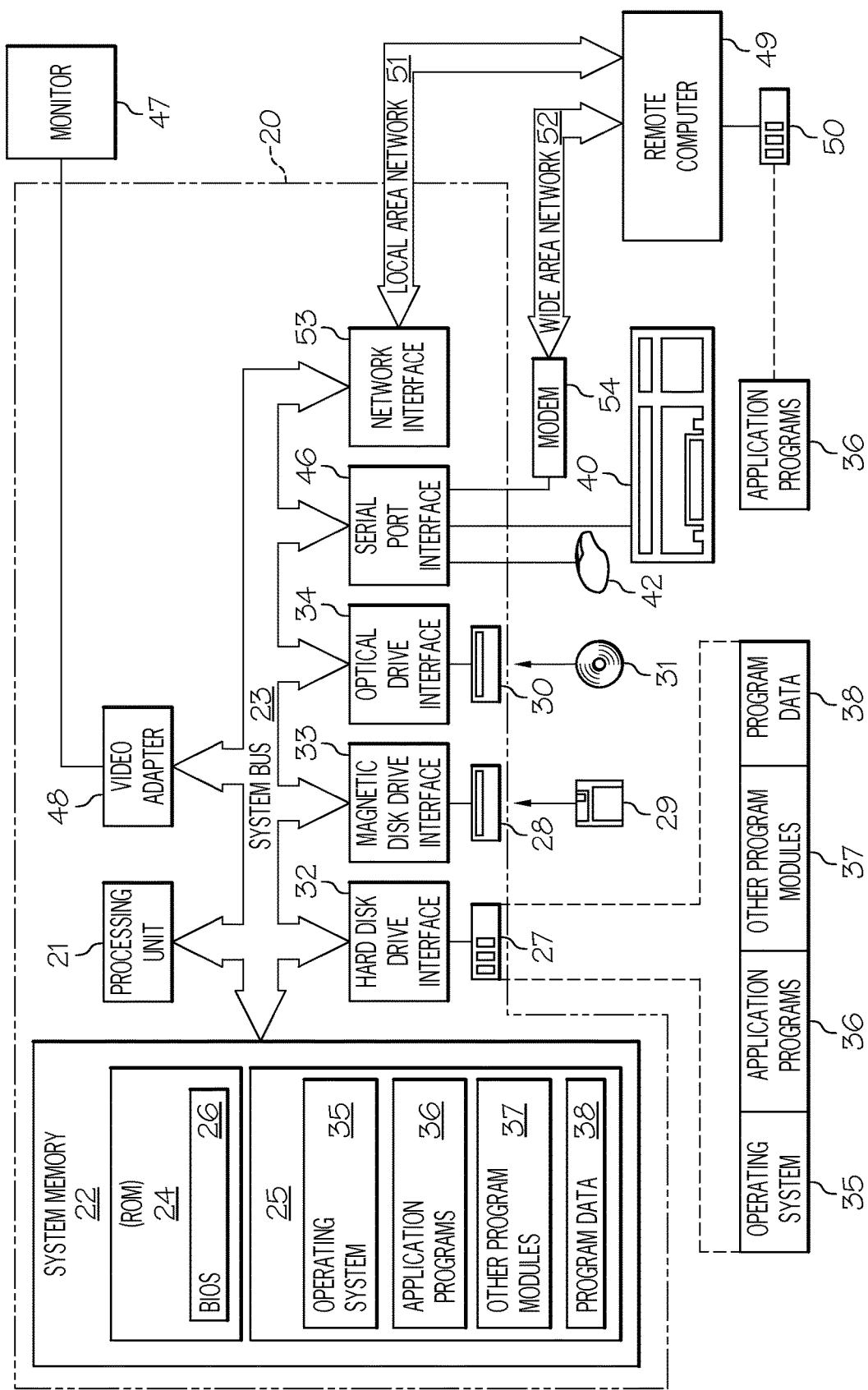
FIG. 12 is a block diagram illustrating an example of a computer system upon which one or more of the embodiments of the present disclosure can execute.

FIG. 12 is an overview diagram of hardware and an operating environment in conjunction with which embodiments may be practiced. The description of FIG. 12 is intended to provide a brief, general description of suitable computer hardware and a suitable computing environment in conjunction with which the embodiments may be implemented. Some embodiments are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, and the like. Embodiments may also be practiced in distributed computer environments where tasks are performed by I/O remote processing devices that are linked through a communications network. In a distributed computing environment, program modules may be located in both local and remote memory storage devices.

In the embodiment shown in FIG. 12, a hardware and operating environment is provided that is applicable to any of the servers and/or remote clients shown in the other Figures.

As shown in FIG. 12, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for one or more embodiments can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the disclosed embodiments are not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 12 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example ensemble machine learning artificial intelligence system for handling customer tickets has been described. Although specific example embodiments have been described, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A system comprising:
    a computer processor;
    a network interface;
    a computer-readable medium comprising instructions executable by the computer processor to cause the system to,
        based on receipt of a ticket that comprises metric based ticket data and textual ticket data,
            analyze the metric based ticket data with a rule based machine learning model to generate a first ticket escalation prediction, with a similarity based machine learning model to generate a second ticket escalation prediction, and with a logistic regression based machine learning model to generate a third ticket escalation prediction,
            analyze the textual ticket data with a natural language text processor to generate a fourth ticket escalation prediction, wherein the textual ticket data comprises text based on communications exchanged between a customer and an agent corresponding to the ticket;
        provide to a low bias meta learner processor the ticket escalation predictions and prior escalation prediction accuracies of the machine learning models and of the natural language text processor;
        generate, with the meta learner processor, a likelihood percentage of an escalation of the ticket based on the prior escalation predictions accuracies and the ticket escalation predictions; and
        display the likelihood percentage of an escalation of the ticket on a computer display device.

2. The system of claim 1, wherein the ticket escalation predictions comprise binary results; and wherein the binary results indicate that a ticket is likely to be escalated or that a ticket is not likely to be escalated.

3. The system of claim 1, wherein the instructions to generate the likelihood percentage of an escalation for the ticket comprises instructions executable by the computer processor to cause the system to:
    combine the ticket escalation predictions based on the prior escalation prediction accuracies.

4. The system of claim 3, wherein the instructions to combine comprise instructions to generate a multiplication product using ticket escalation predictions based on the prior escalation prediction accuracies.

5. The system of claim 1, wherein the computer-readable medium further comprises instructions executable by the computer processor to cause the system to train the machine learning models and the natural language text processor using data from past tickets.

6. The system of claim 1, further comprising an audio analytic processor, wherein the audio analytic processor is operable to:
    receive voice data of the customer and voice data of the agent for the communications exchanges between the customer and the agent;
    execute a sentiment analysis or text mining using the voice data to recognize words and generate the textual ticket data based, at least in part, on the recognized words.

7. The system of claim 1, wherein the computer-readable media further comprises instructions executable by the computer processor to cause the system to assign weights to the metric based data relating to the ticket.

8. The system of claim 1, wherein computer-readable medium further comprises instructions executable by the computer processor to cause the system to periodically calculate an error rate of incorrect predictions of escalations of tickets by the meta learner processor and to retrain the machine learning models and the natural language text processor with recent ticket data when the error rate exceeds a threshold.

9. A process comprising:
    based on receipt of a ticket that comprises metric based ticket data and textual ticket data,
        analyzing the metric based ticket data with a rule based machine learning model to generate a first ticket escalation prediction, with a similarity based machine learning model to generate a second ticket escalation prediction, and with a logistic regression based machine learning model to generate a third ticket escalation prediction,
    analyzing the textual ticket data with a natural language text processor to generate a fourth ticket escalation prediction, wherein the textual ticket data comprises text based on communications exchanged between a customer and an agent corresponding to the ticket;
    providing to a low bias meta learner processor the ticket escalation predictions and prior escalation prediction accuracies of the machine learning models and of the natural language text processor;
    generate, by the low bias meta learner processor, a likelihood percentage of an escalation of the ticket based on the prior escalation predictions accuracies and the ticket escalation predictions; and
    displaying the likelihood percentage of an escalation of the ticket on a computer display device.

10. The process of claim 9, wherein the generating of the likelihood percentage of an escalation for the ticket comprises:
    combining the ticket escalation predictions based on the prior escalation prediction accuracies.

11. The process of claim 9, comprising training the machine learning models and the natural language text processor using data from past tickets, past ticket escalation predictions, and past likelihood percentages of escalation of tickets.

12. A computer readable medium comprising instructions for a customer early escalation meter, the instructions comprising
    first instructions to evaluate metric based data of a ticket with a rule based machine learning model and to generate a first ticket escalation prediction for the ticket from the evaluation with the rule based machine learning model;
    second instructions to evaluate metric based data of the ticket with a similarity based machine learning model and to generate a second ticket escalation prediction for the ticket from the evaluation with the similarity based machine learning model;
    third instructions to evaluate the metric based data of the ticket with a logistic regression based machine learning model and to generate a third ticket escalation prediction for the ticket from the evaluation with the logistic regression based machine learning model;
    fourth instructions to evaluate textual data of the ticket with a natural language text processor and to generate a fourth ticket escalation prediction for the ticket from the evaluation with the natural language text processor, wherein the textual data comprises text based on communications exchanged between a customer and an agent corresponding to the ticket;
    fifth instructions to provide to a low bias meta learner processor the ticket escalation predictions and prior escalation prediction accuracies of the machine learning models and of the natural language text processor;
    sixth instructions, which embody the low bias meta learner processor, to generate a likelihood percentage of an escalation of the ticket based on the prior escalation predictions accuracies and the ticket escalation predictions; and
    visualization instructions to present the likelihood percentage of an escalation of the ticket via a graphical user interface.

13. The computer readable medium of claim 12, wherein the sixth instructions comprise instructions to perform sentiment analysis or text mining on the textual data, wherein the textual data is from voice data of the customer and the agent.

14. The computer readable medium of claim 12, wherein the instructions to generate the likelihood percentage of an escalation of the ticket comprise instructions to aggregate the ticket escalation predictions based on the prior escalation prediction accuracies.

\* \* \* \* \*

UNITED STATES PATENT AND TRADEMARK OFFICE
CERTIFICATE OF CORRECTION

PATENT NO. : 10,438,212 B1
APPLICATION NO. : 14/071096
DATED : October 8, 2019
INVENTOR(S) : Abdul Khader Jilani and Narayanabhatla Lalithakishore It is certified that error appears in the above-identified patent and that said Letters Patent is hereby corrected as shown below:

On the Title Page

Item (54) and in the Specification, Column 1, Lines 1-3, should read:
--ENSEMBLE MACHINE LEARNING BASED PREDICTING OF CUSTOMER TICKETS ESCALATION--

Signed and Sealed this
Twenty-fourth Day of December, 2019

Andrei Iancu
*Director of the United States Patent and Trademark Office*